(12) United States Patent
Andersson et al.

(10) Patent No.: US 8,016,905 B2
(45) Date of Patent: Sep. 13, 2011

(54) FILTER MAT FOR THE PASSAGE OF CONTAMINATED AIR

(75) Inventors: Rolf Andersson, Vara (SE); Kay Grinneback, Kungaiv (SE); Mikael Dahlen, Lidkoping (SE); Jan Berntsson, Kvanum (SE)

(73) Assignee: Absolent AB, Lidkoping (SE)

( * ) Notice: Subject to any disclaimer, the term of this patent is extended or adjusted under 35 U.S.C. 154(b) by 6 days.

(21) Appl. No.: 11/629,482

(22) PCT Filed: Jun. 14, 2005

(86) PCT No.: PCT/SE2005/000892
§ 371 (c)(1),
(2), (4) Date: Dec. 31, 2007

(87) PCT Pub. No.: WO2005/123224
PCT Pub. Date: Dec. 29, 2005

(65) Prior Publication Data
US 2008/0250932 A1    Oct. 16, 2008

(30) Foreign Application Priority Data
Jun. 17, 2004  (SE) ........................................ 0401552

(51) Int. Cl.
*B01D 46/00* (2006.01)
(52) U.S. Cl. ................ 55/423; 55/495; 55/466; 55/527; 55/DIG. 17
(58) Field of Classification Search ...... 55/527, 55/528, 524, 423, 466, DIG. 17; 422/101, 422/58; 96/67, 69, 96; 123/59, 518, 519, 520; 261/107; 210/DIG. 5
See application file for complete search history.

(56) References Cited

U.S. PATENT DOCUMENTS

| | | | | |
|---|---|---|---|---|
| 2,514,623 | A * | 7/1950 | Brown | 55/333 |
| 3,053,253 | A * | 9/1962 | Liloia et al. | 602/1 |
| 3,802,160 | A * | 4/1974 | Foltz | 95/273 |
| 4,086,070 | A * | 4/1978 | Argo et al. | 95/278 |
| 4,748,977 | A * | 6/1988 | Guyot et al. | 604/367 |
| 4,818,257 | A * | 4/1989 | Kennedy et al. | 95/286 |
| 5,085,766 | A * | 2/1992 | Born | 210/150 |
| 6,474,312 | B1 * | 11/2002 | Zulauf et al. | 123/518 |
| 6,497,754 | B2 * | 12/2002 | Joannou | 96/67 |
| 6,858,051 | B2 * | 2/2005 | Uhlenbrock | 55/321 |
| 7,927,394 | B2 * | 4/2011 | MacKenzie et al. | 55/392 |
| 2002/0144490 | A1 * | 10/2002 | Berger | 55/528 |
| 2002/0189457 | A1 * | 12/2002 | Dallas et al. | 96/132 |
| 2004/0040272 | A1 * | 3/2004 | Uhlenbrock | 55/423 |
| 2007/0277485 | A1 * | 12/2007 | MacKenzie et al. | 55/424 |

FOREIGN PATENT DOCUMENTS
SE          518368        10/2002
* cited by examiner

*Primary Examiner* — Duane Smith
*Assistant Examiner* — Karla Hawkins
(74) *Attorney, Agent, or Firm* — Dennison, Schultz & MacDonald

(57) ABSTRACT

The invention relates to a filter mat, which is used in applications where it filters the flows of contaminated air that pass through it. In such mats, there are points where aerosols collect. This is disadvantageous as it lowers the efficiency of the mat. The present invention overcomes this by having, at these points, wicks (2) that absorb said collections.

13 Claims, 1 Drawing Sheet

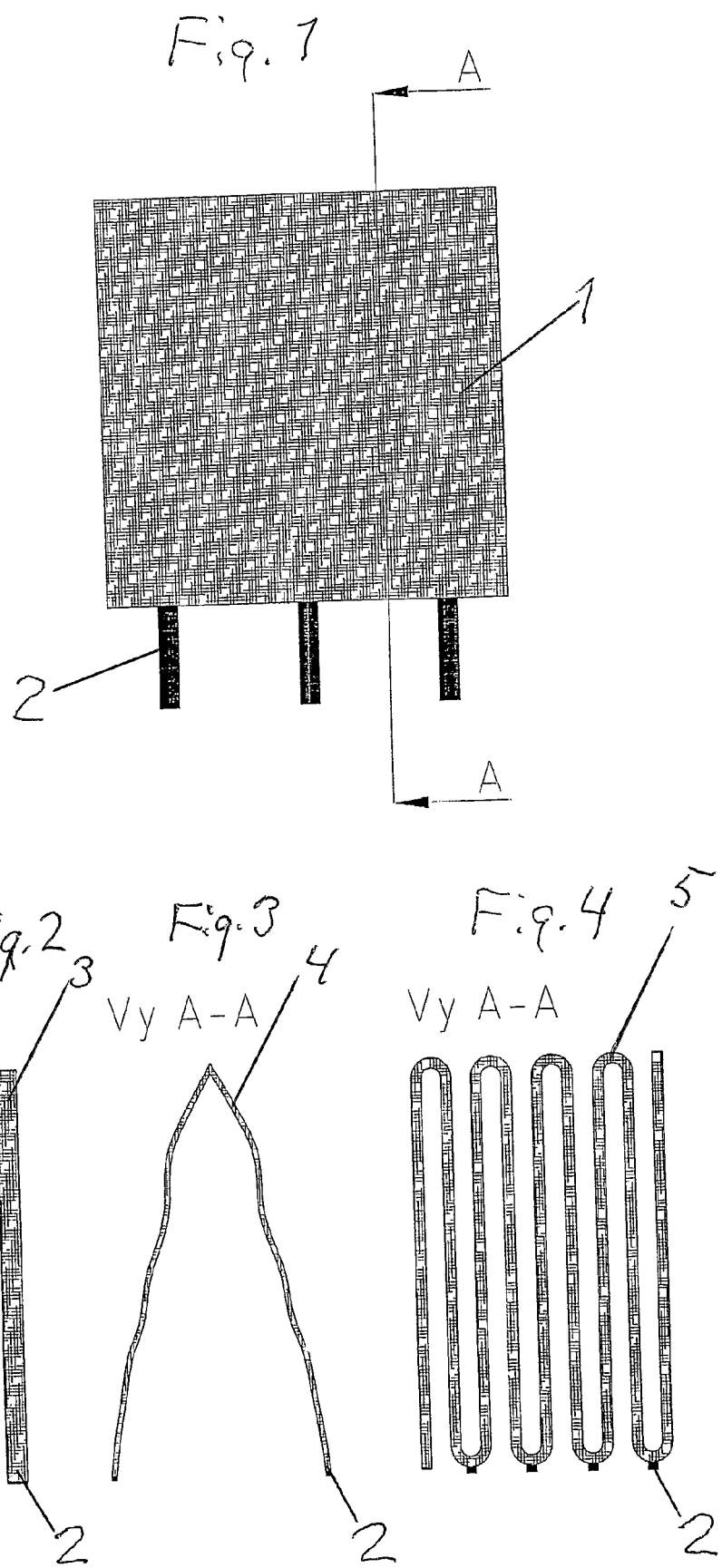

FILTER MAT FOR THE PASSAGE OF CONTAMINATED AIR

This application is a filing under 35 USC 371 of PCT/SE2005/000892, filed Jun. 14, 2005.

BACKGROUND OF THE INVENTION

The present invention is based on a fibre mat for the cleaning of contaminated air. Contaminated air passes through the fibre mat from its front to its back. During this passage, solid particles and drops of liquid (designated as aerosols) are absorbed. These absorbed particles can concentrate at certain points in the filter mat. Consequently, the fibre mat's cleaning efficiency is lowered because these parts of the fibrous mass then prevent passage of contaminated air. The resultant increased pressure drop across the filter is a great disadvantage.

Depending on the type of contamination, different types of filter are required for filtering oil-laden air not only from lathes, milling machines, drills, grinders and hardened drilling tools, but also from machines used in cold rolling, hot rolling, hot forming, die casting, wire drawing and the manufacture and machining of rubber, plastic and so on. In the foregoing application areas, the air flow through the filter is large, normally between 500 and 200,000 $m^3$ per hour. The filter should be able to withstand continuous use. This means that, for at least one year, and without stoppages for draining and cleaning, it must be able to filter air that contains aerosols, usually between 0.5 and 100 mg per cubic meter of air. The filter must be self-draining. This means that the oil trapped by the filter has to be drained while the filter is still in use and with the served machinery still running. Throughout its entire service life, the filter should, when filtering emulsion aerosols and oil aerosols, have a collection efficiency of between 80 and 98 percent. The collection efficiency can be measured using instruments such as the "Dust Track TSI". Furthermore, the filter should be washable and capable of being reused at least five times.

Provided that it can trap the contaminants in the air passing through it, the filter can be of any type whatsoever.

Fibres are a suitable material for filters. Glass fibres of less than 20 micrometers are to be preferred. Glass fibres with a fibre size in the range of 3-12 micrometers are particularly suitable. Fibrous material can be held together by needling. In this process, needles are stuck into the material, thereby pulling some of the surrounding fibres with them. These fibres take up a transversal alignment and hold the material together, even after the needles have been pulled out. As the fibres have been needled securely to each other, rather than joined using a bonding agent, the risk of auto-ignition in the oil filter is considerably reduced.

SUMMARY OF THE INVENTION

The present invention is based on the foregoing data and its aim is to eliminate the collections of aerosols that occur in the filter mat. The latter problem is solved by connecting wicks to the filter mat's back surface at the points where it is calculated that the above-mentioned aerosols collect. Said wicks must be able to attract the collections so that the fibre mat retains full efficiency. The wicks can be rods, plaited tubes or threads. Preferably, they should be made of a material that achieves a surface tension that results in the desired draining properties. Wick width, thickness and length are tailored to produce the desired effect. It has proven particularly suitable to make the wicks of a needled, glass fibre material. Even more particularly, it has proven suitable to use folded fibre mats where the wicks are placed at the points where the fibre mat changes direction. It is advantageous for the fibre mat to have a more or less vertical alignment.

BRIEF DESCRIPTION OF THE DRAWINGS

Design examples of the present invention are given in the attached drawing where:

FIG. 1 shows a filter mat with wicks;
FIG. 2 shows said mat from the side;
FIG. 3 shows a different design of the fibre mat and wicks; and,
FIG. 4 shows a folded fibre mat and its wicks.

DESCRIPTION OF THE PREFERRED EMBODIMENTS

FIGS. 1 and 2 show a basically vertical fibre mat with three wicks (2) where both the fibre mat and the wicks can be made of needled glass fibres of the above-stated dimensions. The liquid aerosols that collect towards the lower end of the fibre mat are sucked up by the wicks at the bottom of the fibre mat.

FIG. 3 shows a fibre mat that comprises two walls. In FIG. 4, the fibre mat has been folded and, at the lower end of its folds (5), equipped with wicks (2).

The use of wicks eliminates liquid from the fibre mat so that the latter is fully functional at all times.

Fibre mat wicks can be made replaceable. Consequently, thanks to the use of wicks, each fibre mat can be used considerably longer.

The essence of the present invention is that the fibre mat and the wicks should be of such materials that the fibre mat attracts aerosols and the wicks attract the aerosols that reduce fibre mat efficiency.

It is obvious that the use of a wick-equipped fibre mat reduces air cleaning costs because, amongst other things, it is less expensive to change wicks than it is to replace a whole filter.

The great advantage of the arrangement in the present invention is that the pressure drop across the filter is reduced. This, in its turn, has the great advantage that it lowers energy consumption.

The invention claimed is:

1. A self-draining filter device for removal of particles and aerosols from contaminated air, comprising:
   a fiber mat formed of a material for maximizing collection efficiency of aerosols, and having a front surface and a back surface, the fiber mat being substantially vertically mounted for continuous flow of contaminated air therethrough from the front surface to the back surface in a direction transverse to the front surface and the back surface; and
   at least one wick attached to and extending downwardly from and below the back surface in a direction transverse to the passage of contaminated air, the wick comprising means for removing, by draining, absorbed aerosols from the fiber mat into the at least one wick.

2. Filter device as in claim 1, wherein the at least one wick is a rod, a network, a thread, a tube or a plaited tube.

3. Filter device as in claim 1, wherein at least one said wick is replaceable to enable longer use of the fiber mat.

4. Filter device as in claim 1, wherein the at least one wick has absorption controlled by surface tension of the material in the wicks.

5. Filter device as in claim 1, wherein the at least one wick is placed in a location where aerosols collect.

6. Filter device as in claim 1, where the fiber mat is folded, and the at least one wick is placed at a fold.

7. Filter device as in claim 1, wherein at least one of the mat and the at least one wick is made of a glass fibers that are held together by needling.

8. Filter device as in claim 7, wherein the fibers have a diameter less than 20 micrometers.

9. Filter device as in claim 1, having a thickness between 3 and 40 mm.

10. Filter device as in claim 1, wherein each wick is securely attached to the mat.

11. A self-draining filter device for removal of particles and aerosols from contaminated air, comprising:

a fiber mat formed of a material having a collection efficiency for aerosols of between 80% and 98%, and having a front surface and a back surface, the fiber mat being substantially vertically mounted for continuous flow of contaminated air therethrough from the front surface to the back surface in a direction transverse to the front surface and the back surface; and at least one wick attached to and extending downwardly from and below the back surface in a direction transverse to the passage of contaminated air, and comprising means for removing, by draining, absorbed aerosols from the fiber mat into the at least one wick.

12. Filter device as in claim 1, which is constructed and arranged to achieve the passage of contaminated air therethrough in an amount of between 500 and 200,000 $m^3$/hr in continuous use.

13. Filter device as in claim 1, wherein the front and back surfaces as mounted are substantially planar.

* * * * *